United States Patent [19]

Rawson et al.

[11] Patent Number: 5,623,997
[45] Date of Patent: Apr. 29, 1997

[54] SOIL ZONE-BUILDER COULTER CLOSER/TILLER

[75] Inventors: Ray Rawson, Farwell, Mich.; William C. Maenle, Ottoville; David R. Smith, Ft. Jennings, both of Ohio

[73] Assignee: Unverferth Manufacturing Co., Inc., Kalida, Ohio

[21] Appl. No.: 520,513

[22] Filed: Aug. 29, 1995

[51] Int. Cl.$^6$ .......................... A01B 49/02; A01B 61/00
[52] U.S. Cl. .......................... 172/156; 172/166; 172/196
[58] Field of Search .................... 111/52, 73, 136, 111/140, 135, 164, 186; 172/156, 164, 166, 256, 178, 328, 413, 484, 603

[56] References Cited

U.S. PATENT DOCUMENTS

| | | | |
|---|---|---|---|
| 2,677,339 | 5/1954 | Armstrong et al. | 172/156 X |
| 2,734,439 | 2/1956 | Padrick | 172/156 |
| 4,213,408 | 7/1980 | West et al. | 172/156 X |
| 4,524,837 | 6/1985 | Harden | 172/156 |
| 5,255,617 | 10/1993 | Williams et al. | 172/166 X |
| 5,333,694 | 8/1994 | Roggenbuck et al. | 172/156 |

OTHER PUBLICATIONS

"Yetter... for land's sake!", Yetter Manufacturing Company Catalogue, pp. 3 and 15.
"Yetter/best on earth", Yetter Manufacturing Company '95/'96 Product Catalogue, pp. 16, 17 and 22–25.
"Kinze 2000 Series Planters", Kinze Manufacturing, Inc., pp. 5 and 9.
"Yetter/The Only Choice", Yetter Manufacturing Company '94/'95 Product Catalogue, pp. 3, 10, 11 and 15.
"Great Plains/Specialists in the Science of Seed Placement", Great Plains Acceptance Corporation Catalogue, p. 8.

Primary Examiner—Terry Lee Melius
Assistant Examiner—Robert Pezzuto
Attorney, Agent, or Firm—Rothwell, Figg, Ernst & Kurz

[57] ABSTRACT

A soil manipulation device is provided for closing a groove in soil formed by a soil tiller shank. The device includes a frame connected to a rear portion of the tiller shank and a pair of rotatable coulter blades mounted on the frame for engaging soil behind the tiller shank. The coulter blades are positioned on opposite sides of the groove so as to close the groove in the soil behind the tiller shank. The coulter blades are selectively movable and positionable in directions toward and away from each other so as to vary the distance between the coulter blades. The coulter blades also are selectively movable and positionable in a substantially vertical direction with respect to the frame, so as to permit variation in depth of coulter blade penetration into the soil. The coulter blades have side surfaces which are selectively movable and positionable from orientations which are substantially in parallel with the groove to orientations which are out of parallel with the groove, so as to variably manipulate soil on opposite sides of the groove.

20 Claims, 3 Drawing Sheets

SOIL ZONE-BUILDER COULTER CLOSER/TILLER

BACKGROUND OF THE INVENTION

1. Field of the Invention

The present invention relates to the field of soil manipulation devices for agricultural use.

2. Description of the Background Art

There are several ways in which farm land is prepared for planting or seeding. In the past, the land was turned over by a plow, cut by disks, pulverized by a harrow, etc. However, preparing the soil in this manner is less desirable or unacceptable in some circumstances due to erosion problems caused by use of the above apparatus, particularly such use on contoured land. Thus, there has been significant interest in "low-till" and "no-till" farming, which, rather than turning over and tilling an entire field, tills only spaced strips of soil. This method of soil preparation reduces the damaging effects of erosion on the soil.

The strips of soil are tilled by tools which penetrate the surface of the soil and form a seedbed area for planting. The apparatus may use a fixed tiller point to till the soil, or rotatable coulter wheels or disks to cut and mix the soil, followed by a penetrating blade for additional cultivation of the soil. In addition, apparatus for penetrating the soil hardpan to form a passage therein beneath the seedbed may be used as well. The tillage apparatus may be followed by a planter or drill which places seed in the seedbed prepared along each strip of soil. Alternatively, the soil can be tilled in the fall to form a bed which can be seeded the following spring.

There remains a need in the art for improved apparatus for soil manipulation and preparation of seedbeds.

SUMMARY OF THE INVENTION

In accordance with the present invention, a soil manipulation device is provided for closing a groove in soil formed by a soil tiller shank. The device includes a frame for being connected to the soil tiller shank. A pair of rotatable coulter blades is mounted on the frame for engaging soil behind or beside the tiller shank. The coulter blades are positioned on opposite sides of the groove, so as to close the groove formed in the soil behind the tiller shank. The coulter blades are selectively movable and positionable toward and away from each other, to vary the distance between the coulter blades. The coulter blades also are selectively movable and positionable substantially vertically with respect to the frame so as to permit variation of depth of coulter blade penetration into the soil. The coulter blades have side surfaces which are selectively movable and positionable from orientations which are substantially parallel with the groove in the soil, to orientations which are out of parallel with the groove, so as to variably manipulate soil on opposite sides of the groove.

DETAILED DESCRIPTION OF THE INVENTION

Figure 1:
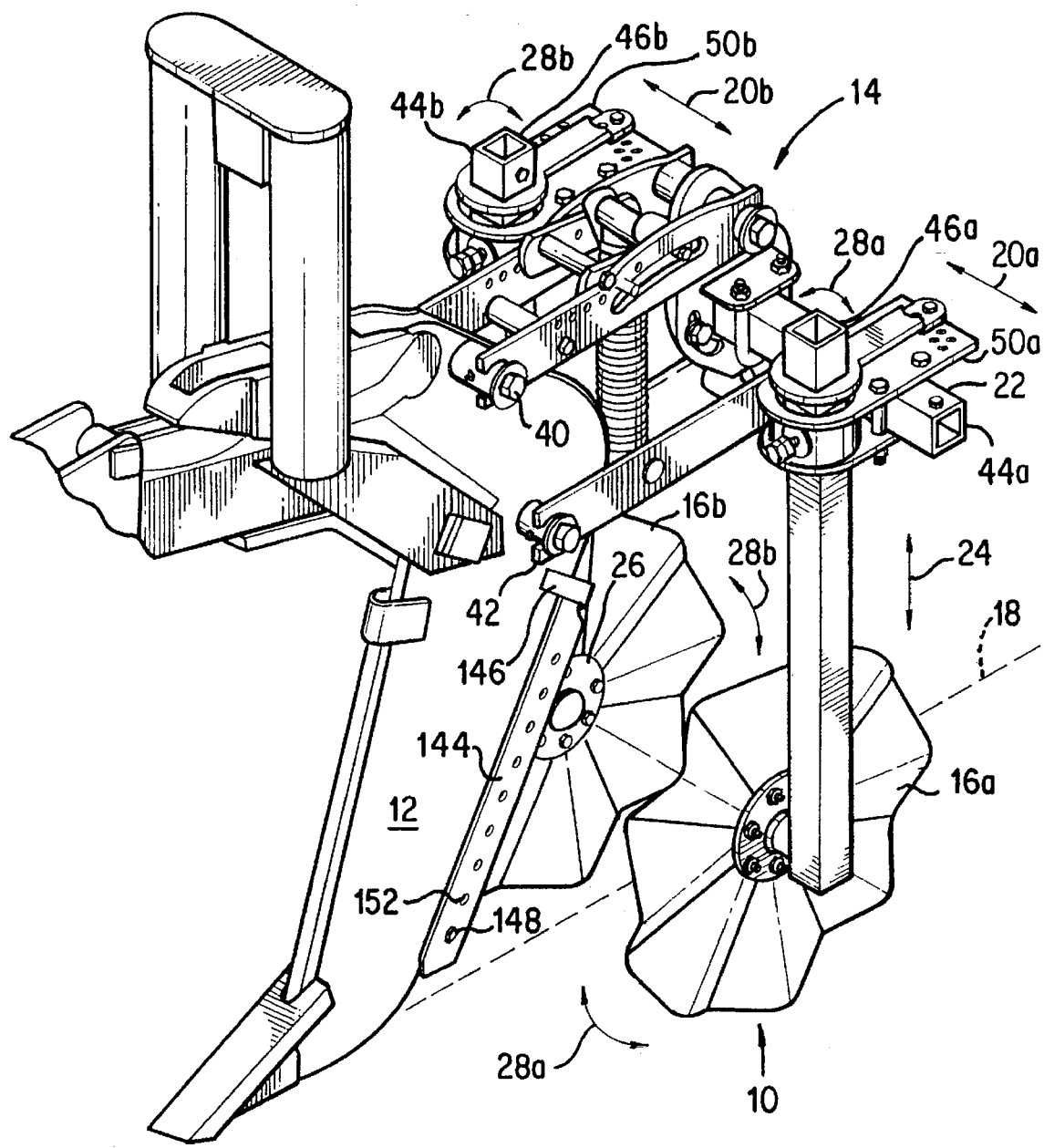
FIG. 1 is a perspective view showing a zone-builder coulter closer and tiller in accordance with one embodiment of the present invention utilizing fluted coulter blades, with portions broken away of the means for connecting the tiller to a tool bar of a farm implement.

The closer 10 of the present invention is adapted to be connected to and mounted behind a soil tiller shank 12 as shown in FIG. 1. The tiller shank 12 is adapted to be mounted on the tool bar of a farm implement (not shown) such as disclosed in U.S. Pat. No. 5,370,068 or U.S. Ser. No. 08/418,148, both incorporated herein by reference.

The closer 10 is an agricultural tillage attachment for closing the groove made by tiller shank 12 while soil is being tilled, to create a zone of soil in which seed may be planted. The closer 10 includes a frame 14 for being connected to tiller shank 12. Closer 10 includes a pair of rotatable coulter blades 16a, 16b which are mounted on frame 14 for engaging soil behind or beside tiller shank 12. In the embodiment shown in FIGS. 1 and 2, coulter blades 16a, 16b are fluted. Alternatively, the blades can be disk blades 16c, 16d as shown in FIG. 3.

Coulter blades 16a, 16b are positioned on opposite sides of a groove 18 formed in the soil by tiller shank 12. The groove 18 is schematically represented by a broken line, as shown in FIG. 1. Coulter blades 16a, 16b are positioned to close groove 18 in the soil behind tiller shank 12.

Coulter blades 16a, 16b are selectively movable and positionable toward and away from each other, in the direction of double-ended arrows 20a and 20b, to vary the distance between coulter blades 16a, 16b. In the embodiment shown, the coulter blades are independently movable and positionable along a horizontal mounting bar 22.

Coulter blades 16a, 16b also are selectively movable and positionable substantially vertically with respect to frame 14, in the direction of double-ended arrow 24, so as to permit variation in depth of coulter blade penetration into the soil. In the embodiment shown, coulter blades 16a, 16b are independently movable and positionable vertically on mounting bar 22.

Each of the coulter blades 16a, 16b has a side surface 26, shown on coulter blade 16b in FIG. 1. The side surfaces 26 of coulter blades 16a, 16b are selectively movable and positionable in the direction of double-ended arrows 28a and 28b, from orientations which are substantially parallel with groove 18, to orientations which are out of parallel with groove 18, so as to variably manipulate soil on opposite sides of groove 18. In the embodiment shown in FIG. 1, surfaces 26 of coulter blades 16a, 16b are independently movable and positionable in the directions represented by double-ended arrows 28a and 28b.

Figure 2:
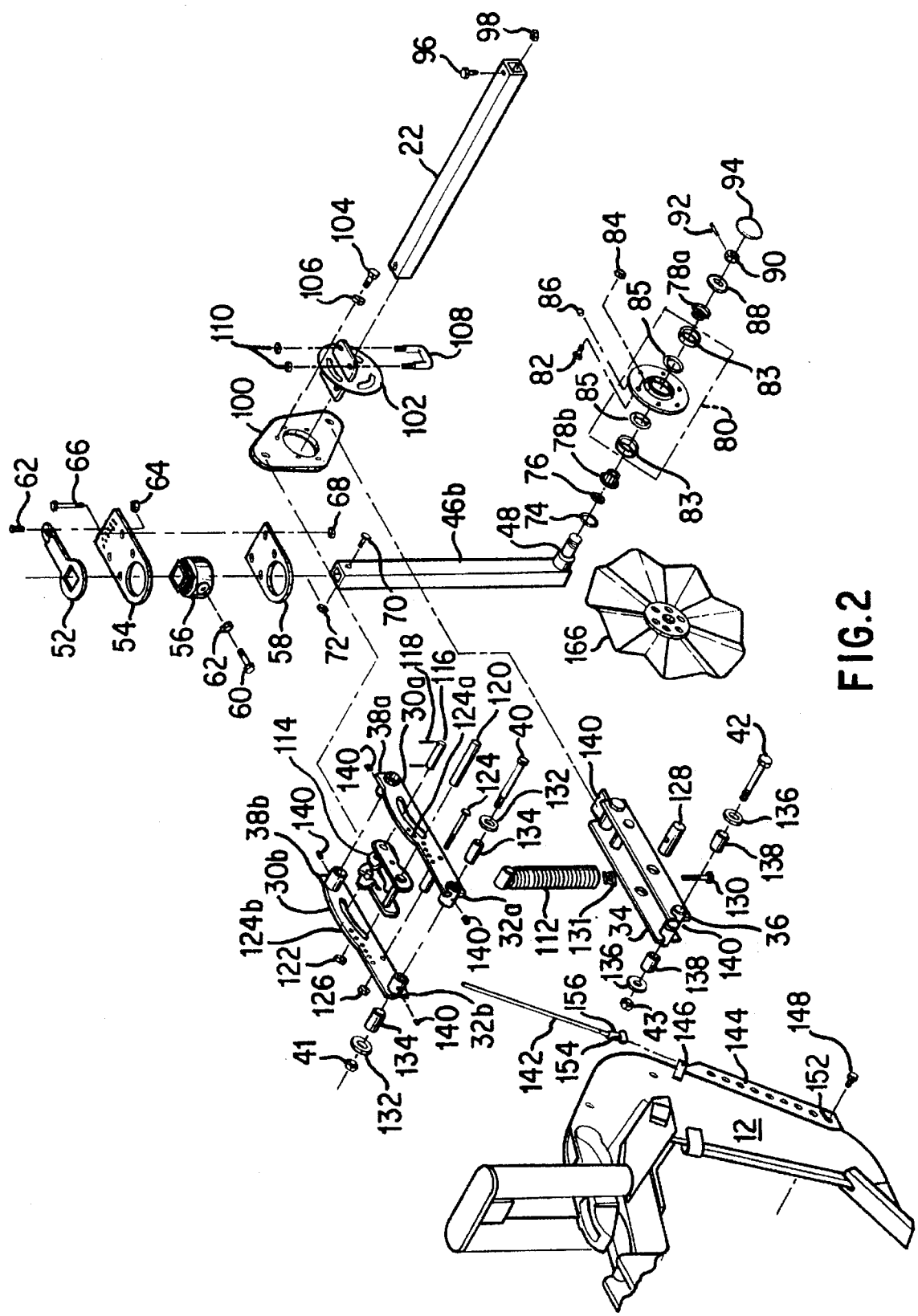
FIG. 2 is an exploded view, with portions removed for clarity, of the zone-builder coulter closer shown in FIG. 1.
Figure 3:
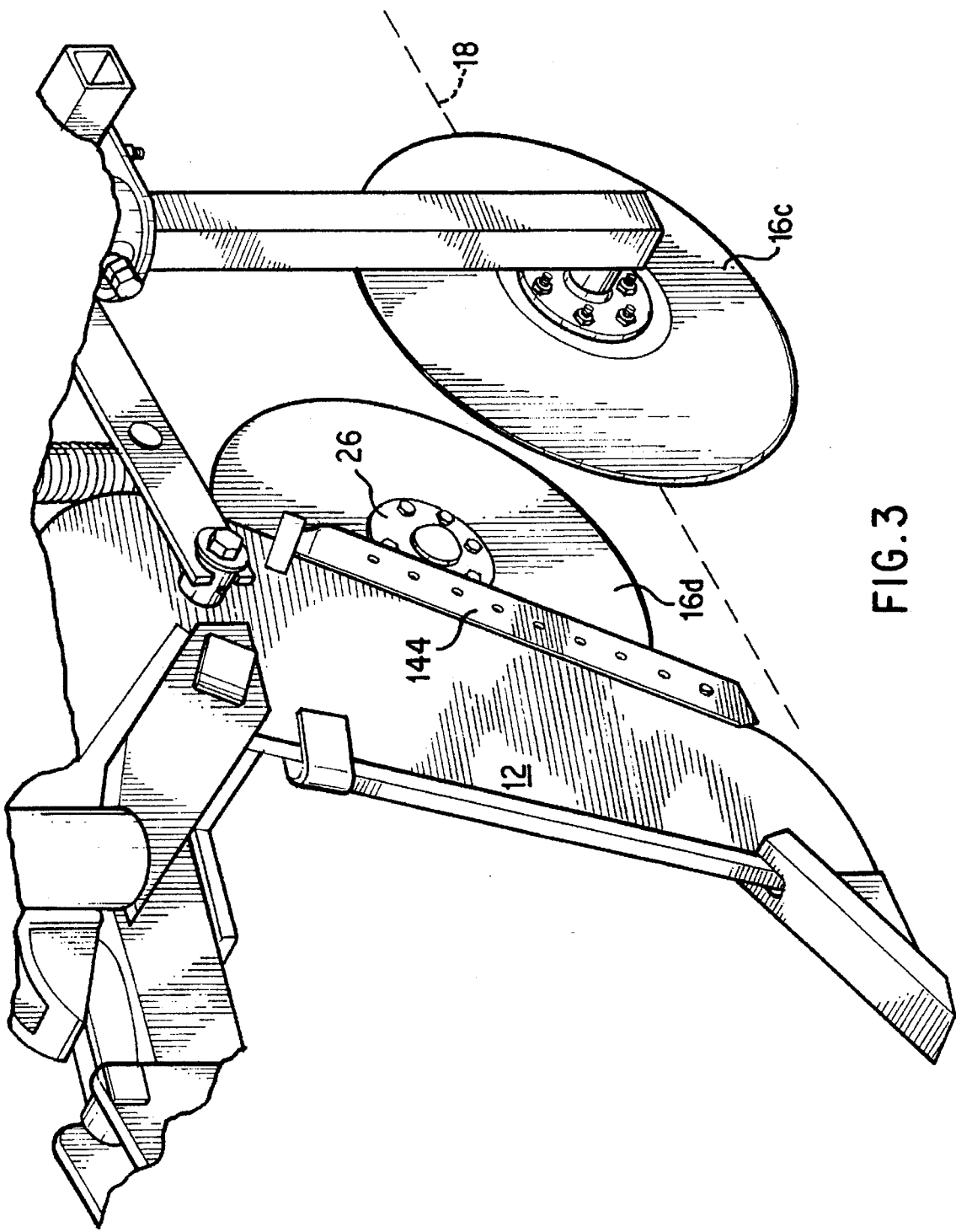
FIG. 3 is a perspective detailed view of a second embodiment of the invention utilizing disk closer blades.

Details of support frame 14 and the means for independently and selectively moving and positioning the coulter blades are shown in FIG. 2. Frame 14 is a parallel bar linkage including an upper link member which is an assembly comprised of top link submembers 30a and 30b having respective first ends 32a and 32b for being secured to an upper portion of tiller shank 12.

A lower link member 34 is provided, having a first end 36 for being secured to a lower portion of the tiller shank.

A coulter blade support structure, including horizontal mounting bar 22, is secured to top link submembers 30a, 30b, and lower link member 34, at ends thereof 38a, 38b and 40, respectively, which are opposite the respective first ends 32a, 32b and 36 of the upper and lower link members described above.

The parallel bar linkage comprised of top link submembers 30a, 30b and lower link member 34, along with the coulter blade support structure, are movable together in a vertical direction relative to the tiller shank by pivoting at cap screws 40, 42 from an upper storage position (not shown) out of engagement with the soil to the soil-engaging and -closing working position shown in FIG. 1.

The horizontal mounting bar 22 has ends 44a, 44b which extend outwardly from opposite sides of the parallel bar linkage in a direction substantially perpendicular to the direction of groove 18. Mounted adjacent each end 44a, 44b of horizontal mounting bar 22 is a respective coulter arm 46a, 46b for holding a respectively coulter blade 16a, 16b. Each of the coulter arms (one being shown in FIG. 2) have a lower end to which is perpendicularly mounted a coulter axle, bearing and hub for carrying a respective coulter blade.

Referring back to FIG. 1, each coulter arm 46a, 46b is mounted on mounting bar 22 by respective mounting clamps 50a, 50b, providing independent means for selectively moving and positioning each of the coulter blades in the vertical direction represented by double-ended arrow 24, and in the directions toward and away from each other, represented by double-ended arrows 20a and 20b. Mounting clamps 50a, 50b further provide means for selectively moving and positioning the side surfaces 26 of the coulter blades in and out of parallel with groove 18.

As shown in FIG. 2, each mounting clamp includes a handle weldment 52, top plate 54, pivot casting 56 and bottom plate 58. Vertical adjustment fixing means of each coulter arm is provided by a cap screw 60 and hex jam nut 62.

Adjustment of the coulter blade side surfaces in and out of parallel with the groove formed in the soil is provided by handle weldment 52 and plate 54, held in place by cap screw 62 and lock nut 64. Plates 54 and 58 are clamped onto horizontal mounting bar 22 by four cap screw/lock nut combinations 66, 68 (one combination shown in FIG. 2 for clarity).

The upper end of each coulter arm is prevented from slipping out of pivot casting 56 by a cap screw/lock nut combination 70, 72.

As shown in FIG. 2, coulter blade 16b is mounted on axle 48 of coulter arm 46b by means including seal 74, O-ring 76, bearing cones 78a, 78b and a hub sub-assembly 80. The coulter blade is fastened to the hub sub-assembly 80 by a plurality of cap screw/lock nut combinations 82, 84 (one combination shown in FIG. 2). The hub sub-assembly 80 further includes bearing cups 83, snap rings 85, and grease zerk 86 for lubrication. The coulter blade and sub-assembly are held on axle 48 by a washer 88, a slotted nut/roll pin combination 90, 92 and a hub cap 94.

The mounting clamps 50a, 50b are prevented from slipping off the ends of the mounting bar 22 by cap screw/lock nut combinations 96, 98 at each end of mounting bar 22 (one combination shown in FIG. 2).

Mounting arm 22 is connected to the parallel linkage by means including plate 100 and swivel weldment 102. Mounting arm 22 is rotatable with swivel weldment 102, allowing horizontal adjustment of the coulter blades forwardly and rearwardly in relation to tiller shank 12. Swivel weldment 102 is attached to plate 100 by means including three cap screw/lock washer combinations 104, 106 (one combination shown in FIG. 2). Mounting arm 22 is attached to swivel weldment 102 by a pair of U-bolt lock nut combinations 108, 110 (one combination shown in FIG. 2).

An adjustable spring 112 is provided for biasing the coulter blades toward the soil, and varying the biasing force, as desired. Spring 112 is attached to the upper link members by a link weldment 114. Spring 112 is attached to link weldment 114 by means including a pin/roll pin combination 116, 118.

Biasing force of spring 112 is varied by means including a pin/klik pin assembly 120, 122 which cooperates with a plurality of adjustment openings 124a, 124b in top link submembers 30a, 30b, respectively. Top link submembers 30a, 30b are held together by means including cap screw 124 and lock nut 126.

The lower end of spring 112 is connected to lower link member 40 by means including trunion 128 and cap screw 130 attached to a corresponding bottom threaded spring plug 131.

As noted above, the upper link member is attached to tiller shank 12 by means including cap screw 40, which is fastened by a corresponding lock nut 41. Further means for attaching the upper link member to shank 12 include flat washers 132 and bushings 134.

As further noted above, the means for attaching the lower link member to shank 12 include cap screw 42, which is fastened by a corresponding lock nut 43. Additional attachment means include flat washers 136 and bushings 138.

For lubrication purposes, grease zerks 140 are provided at pivoting locations.

Optionally, means are provided for dispensing fertilizer to the soil, which can be mounted on a rear portion of tiller shank 12. In the embodiment shown, the fertilizer dispensing means includes a fertilizer tube 142 for dispensing liquid fertilizer. Fertilizer tube 142 is connected to a rear portion of tiller shank 12 by means including an injector tube guide bar 144, which can be welded to tiller shank 12 and/or fastened by means including a U-shaped collar 146.

In preferred embodiments, the fertilizer dispensing means is adjustable so as to permit variation in depth of fertilizer placement in the soil. In the embodiment shown, the depth-adjustment means includes a roll pin 148, which is fastened in a selected opening 152 of guide bar 144, and opening 154 of fertilizer tube fastener 156, so as to position fertilizer placement at a desired depth in the soil.

The present invention also is directed to a process for manipulating soil for forming a seed planting zone, which process includes forming a groove in soil with a soil tiller shank and closing the groove with a soil-manipulation device as described above. The process of the invention can include independently adjusting the coulter blades in the substantially vertical direction prior to forming and closing the groove, independently adjusting the coulter blades toward or away from each other prior to forming and closing the groove, and/or adjusting the side surfaces of the coulter blades in or out of parallel with the groove prior to forming and closing the groove.

The present invention provides an agricultural tillage attachment for closing the groove made by a tiller shank, and process for utilizing same. The invention can be utilized to create an optimal zone in soil in which seed may be planted. The position of the coulter blades can be adjusted to close the groove, work the soil and provide a mound over the groove. If done in the fall, the thus-created zone warms earlier in the spring and is ready earlier for spring planting. The adjustable fertilizer dispensing means relative to shank depth gives the farmer the flexibility to till at a depth required to cut through an existing "hard-pan" and place fertilizer at an optimum position for crop utilization. Adjustment of the coulter blades toward or away from each other allows the farmer to set the width of the zone to match the operation requirements. Vertical adjustment of the coulter blades allows the farmer to set the depth of the coulter blades relative to the depth of the tiller shank, thereby enabling the farmer to control the volume of soil manipulated. Adjusting the side surfaces of the coulter blades in or out of parallel with the groove allows the farmer to control the amount of soil placed into a mound over the groove.

Many modifications, variations and changes in detail may be made to the described embodiments, and it is intended that all matter in the foregoing description and as shown in the accompanying drawings be interpreted as illustrative and not in a limiting sense.

We claim:

1. A soil manipulation device for closing a groove in soil formed by a soil tiller shank, comprising:
   a support frame for being connected to said soil tiller shank; and
   a pair of rotatable coulter blades mounted on the frame for engaging soil behind said tiller shank; said coulter blades being positioned on opposite sides of said groove so as to close said groove in said soil behind said tiller shank; said coulter blades being selectively movable and positionable in directions toward and away from each other so as to varying distance between said coulter blades; said coulter blades being selectively movable and positionable in a substantially vertical direction with respect to said frame so as to permit variation in depth of coulter blade penetration into said soil; said coulter blades having side surfaces which are selectively movable and positionable from orientations which are substantially in parallel with said groove to orientations which are substantially out of parallel with said groove so as to variably manipulate soil on opposite sides of said groove, wherein the frame comprises a parallel bar linkage which includes an upper link member having a first end for being secured to an upper portion of said tiller shank, a lower link member having a first end for being secured to a lower portion of said tiller shank, and a coulter blade support structure secured to the upper link member and lower link member at ends thereof opposite said first ends, wherein the upper link member, the lower link member and the coulter blade support structure are movable together in a vertical direction relative to said tiller shank, and further including at least one spring member having an upper end connected to the upper link member and a lower end connected to the lower link member for biasing said coulter blades toward said soil in a generally downward direction.

2. The device of claim 1, wherein said coulter blades are selectively movable and positionable forwardly and rearwardly with respect to said tiller shank in a substantially horizontal direction.

3. The device of claim 1, wherein said at least one spring member is adjustable for varying biasing force of said coulter blades toward the soil.

4. The device of claim 1, wherein said coulter blades are selectively movable and positionable independently with respect to each other in said substantially vertical direction, and in said directions toward and away from each other; and wherein said side surfaces are selectively movable and positionable independently with respect to each other in and out of parallel with said groove.

5. The device of claim 3, wherein the upper end of the spring member is adjustably connected to the upper link member for varying said biasing force.

6. The device of claim 5, wherein said upper link member includes a plurality of adjustment openings which are connectable with the upper end of the spring member by a pin for varying said biasing force.

7. The device of claim 1, wherein the upper link member, the lower link member and the coulter blade support structure are movable together in said vertical direction relative to said tiller shank from a storage position out of engagement with said soil to a working position engaging said soil.

8. The device of claim 1, wherein said coulter blade support structure includes a substantially horizontal mounting bar having ends which extend outwardly from opposite sides of said linkage in a direction substantially perpendicular to the direction of said groove, said coulter blade support structure further including a pair of coulter arms, each coulter arm being substantially perpendicularly mounted adjacent a respective end of said mounting bar for holding the respective coulter blade, each of the coulter arms having a lower end thereof to which is perpendicularly mounted a coulter axle carrying said respective coulter blade.

9. The device of claim 8, wherein each coulter arm is mounted on said mounting bar by a mounting clamp which provides means for selectively moving and positioning said coulter blades independently with respect to each other in said substantially vertical direction, and in said directions toward and away from each other; and which further provides means for selectively moving and positioning said side surfaces in and out of parallel with said groove.

10. The device of claim 1, wherein said blades are fluted.

11. The device of claim 1, wherein said blades are disk blades.

12. A soil manipulating apparatus, comprising:
    a soil tiller having a tiller shank as defined in claim 1 which forms a groove in soil; and
    a device as claimed in claim 1 for closing said groove in soil formed by said tiller shank.

13. The apparatus of claim 12, wherein said blades are fluted.

14. The apparatus of claim 12, wherein said blades are disk blades.

15. The apparatus of claim 12, further including means for dispensing fertilizer to the soil, mounted on a rear portion of said tiller shank.

16. The apparatus of claim 15, wherein the fertilizer dispensing means is adjustable so as to permit variation in depth of fertilizer placement in the soil.

17. A process for manipulating soil for forming a seed planting zone, comprising:
    forming a groove in soil with a soil tiller shank; and
    closing said groove with a soil manipulation device comprising a frame connected to said tiller shank, a pair of rotatable coulter blades mounted on the frame, said coulter blades being selectively movable and positionable in directions toward and away from each other so as to vary distance between said coulter blades, said coulter blades being selectively movable and positionable in a substantially vertical direction with respect to said frame so as to permit variation in depth of coulter blade penetration into said soil, and said coulter blades having side surfaces which are selectively movable and positionable from orientations which are substantially in parallel with said groove to orientations which are substantially out of parallel with said groove so as to variably manipulate soil on opposite sides of said groove, wherein the frame comprises a parallel bar linkage which includes an upper link member having a first end for being secured to an upper portion of said tiller shank, a lower link member having a first end for being secured to a lower portion of said tiller shank, and a coulter blade support structure secured to the upper link member and lower link member at ends thereof opposite said first ends, wherein the upper link member, the lower link member and the coulter blade support structure are movable together in a vertical direction relative to said tiller shank, and further including at least one spring member having an upper end connected to the upper link member and a lower end connected to the lower link member for biasing said coulter blades toward said soil in a generally downward direction.

18. The process of claim 17, wherein said groove is closed with said device in which said coulter blades are further selectively movable and positionable forwardly and rearwardly in a substantially horizontal direction with respect to said tiller shank.

19. The process of claim 18, further comprising at least one step selected from the group consisting of adjusting the coulter blades forwardly or rearwardly in said substantially horizontal direction prior to forming and closing said groove, independently adjusting said coulter blades in said substantially vertical direction prior to forming and closing said groove, independently adjusting said coulter blades toward or away from each other prior to forming and closing said groove, independently adjusting the side surfaces of said coulter blades in or out of an orientation which is substantially parallel with said groove prior to forming and closing said groove, and adjusting biasing force of said at least one spring member so as to adjust the biasing of the coulter blades toward said soil.

20. The process of claim 18, wherein said blades are selected from the group consisting of fluted blades and disk blades.

* * * * *